April 14, 1931. J. B. J. A. VIGNERON 1,800,270
FISHING NET PROVIDED WITH WING STRETCHER
Filed July 24, 1929   3 Sheets-Sheet 1
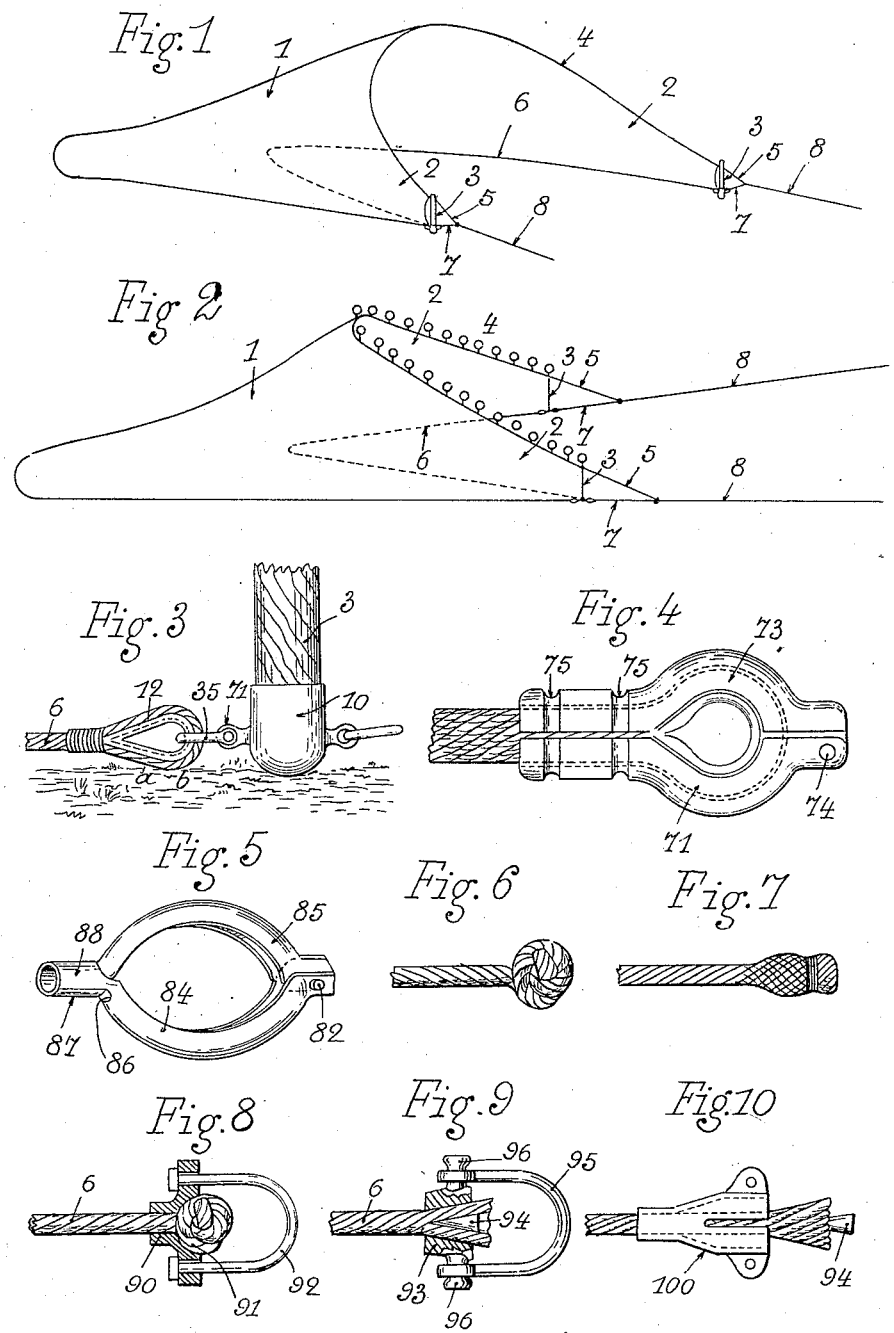

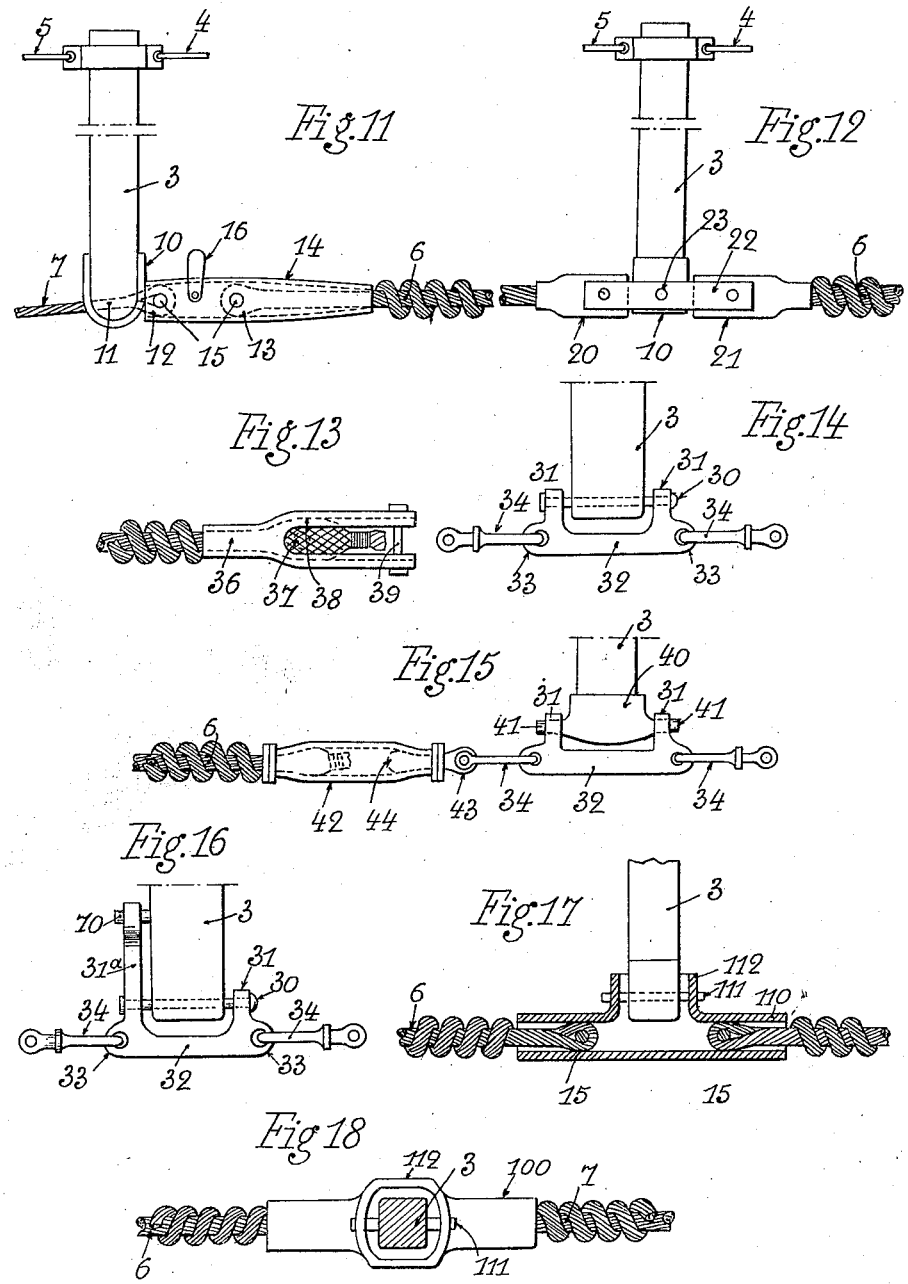

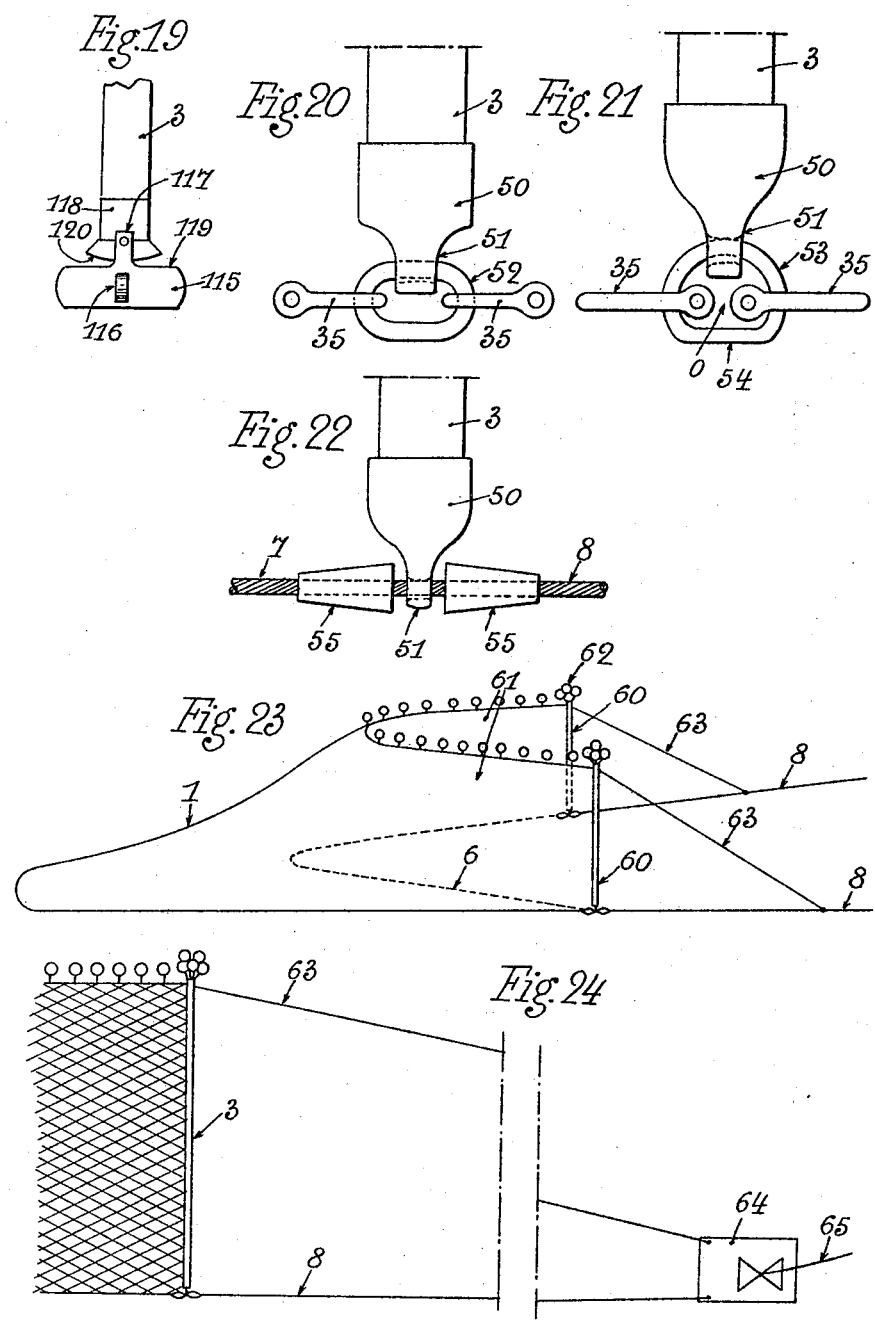

Patented Apr. 14, 1931

1,800,270

UNITED STATES PATENT OFFICE

JEAN-BAPTISTE JOSEPH ALPHONSE VIGNERON, OF LA ROCHELLE, FRANCE, ASSIGNOR TO V. D. LIMITED, OF LONDON, ENGLAND

FISHING NET PROVIDED WITH WING STRETCHERS

Application filed July 24, 1929, Serial No. 380,491, and in France May 7, 1929.

The present invention relates to fishing nets in which the ends of the wings are provided with wing stretchers which serve to stretch the ends of the wings vertically, and it has for its object various improvements in the methods of attaching the wing stretchers in order to increase their stability.

For this purpose, and according to the invention, the wing stretcher is so disposed that the net cable and the ground rope may be attached to the lowermost portion of the said wing stretcher, whereby the lower end of the latter will not project from the attaching members for said cables.

This arrangement prevents the wing stretcher from tilting over when meeting with obstacles, or due to "crab crawling" of the wing stretchers, or to any other abnormal resistance to forward movement.

This tendency to tilt over is strongly marked in the usual wing stretchers, in which the lower end projects through a considerable length below the cables or their attaching members, thus forming a lever arm which furthers the tilting motion. The said arrangement also has the advantage that the net cable and the ground rope now rub upon the ground at close proximity to the lower end of the wing stretcher, thus avoiding the escape of the flat fish, whereas in the usual wing stretchers, a certain proportion of the fish escape below said cables, because the latter are attached at a certain height above the bottom of the wing stretcher.

Generally, since at least one of the cables (usually the ground rope) consists of hemp or other textile material, it is advantageous to protect the attaching portion of said cable adjacent the wing stretcher, which projects downwardly and thus rubs strongly upon the ground, by means of a protecting device which preferably consists of a metallic protector or guard surrounding the thimble or other part of the cable by which it is secured to the attaching member on the stretcher. The said protecting device has also the advantage consisting that its bottom part forms a substantially continuous surface with the bottom of the wing stretcher, and this facilitates the sliding of the whole upon the ground and still further prevents the lower end of the wing stretcher from catching with obstacles.

Said protecting devices are so constructed as to possess the minimum bulk or to project as slightly as possible from the cables, in order that the cables should not be raised above the ground when the latter is hard; in order to properly capture the fish and to provide for the stability of the apparatus, the cables should rest upon the ground in a practically uniform manner upon their whole length. These attaching and protecting devices of reduced size may be employed for joining abutting portions of any dragging cables, such as ground ropes, net cables, towing hawsers, etc.

The wing stretcher may be further relieved of any inclining torque which may act upon it, by connecting said stretcher to the lower cables or to their attaching devices by a loose, flexible or pivotal connection.

Due to the increase of stability of the wing stretchers thus obtained, the height of the said wing stretchers can be much increased. While in the known devices, the height of the wing stretchers does not materially exceed 1 meter, by the use of the aforesaid devices, the said wing stretchers can be readily given a height of 5 to 6 meters.

Hence, the invention further relates to a fishing gear comprising very high wings provided at the front ends with wing stretchers of great height, which are connected at the lower end to the ground rope and to the net cable by any one of the aforesaid devices, and at the upper end to the net cable or optionally to a shear board or any other means for opening the net in width, by means of an additional cable.

The accompanying drawing shows by way of example various embodiments of the invention.

Fig. 1 is a perspective view of the usual fishing net provided with wing stretchers, which are attached to the lower cables in the usual manner.

Fig. 2 is a view similar to Fig. 1, showing a net wherein the wing strechers are provided with improved attaching means for the lower cables according to the invention.

Fig. 3 shows a wing strecher provided with usual attaching means for the lower cables.

Figs. 4 to 22 illustrate various modifications of the attaching means according to the invention.

Fig. 23 is a view similar to Fig. 3, showing a fishing net with very high wings and, Fig. 24 is a partial elevational view showing a modification of Fig. 23.

Referring to Fig. 1, 1 is a fishing net whose wings 2 are provided at their front ends with wing stretchers 3, the upper ends of which are attached to the head rope 4 and to the upper strand 5 of a crow foot, the bottom of the said wing stretchers being attached to the ground rope 6 and to the lower strand 7 of the crow foot, whose vertex is attached to a net cable 8, running for example to a shear board (not shown).

In the usual nets, the ground rope 6 and the cable 7 are attached to the wing stretcher at a rather considerable height (about 20 cm.) above the base of the wing stretcher. With this arrangement, the bottom of the wing stretcher extends below the cables or their attaching parts, and this offers the following drawbacks.

When the sea bottom is hard and rocky, the bottom of the wing stretcher, when an obstacle is encountered, abuts against this latter, and, since the wing stretcher is subjected to a forward traction at the attaching point of the said part of the cable, it will constantly tilt over, and chiefly towards the side, due to the "crab crawling" of the strechers. This produces a deformation and subsequent damage of the net, whose capturing power is thus materially reduced. When the sea bottom is soft and muddy, the wing stretcher sinks into the ground and ploughs it up, and the strong resistance to the travel which occurs at the bottom of the wing stretcher thus increases the consumption of fuel by the trawler and tends to produce the same effects as above mentioned.

To obviate this defect, and according to the invention, the wing stretcher is arranged in such manner that the net cable 8 (or the lower strand 7 of the crow foot) and the ground rope 6 are attached at the lowermost portion of the wing stretcher (Fig. 2), whereby the latter will not materially project from said cables.

It will be seen, however, that in such an arrangement, the parts of the lower cables adjacent the stretcher 3, that is, the part $ab$ surrounding the thimble 12 (Fig. 3) through which extends the shackle 35 connecting the ground rope to the eyelet 71 of the shoe 10 at the base of the stretcher 3, will generally be rapidly worn, especially when the cables are made of hemp.

The devices to be further described are adapted to obviate such defects.

The device shown in Figure 4 comprises two semicircular shells 72 and 73, having a concave cross-section which are pivoted together at one end about a pin 74, and are terminated at the other end by two half-sockets; said shells and sockets are adapted to fit upon the cable and its spliced portion. In the middle portion, the shells merge with thimble 12, thus entirely enclosing the rope. The loop of the cable, provided with its thimble, is inserted between the two shells, the latter are closed upon the cable and the two half-sockets are attached together (for instance by means of iron wire or collars, engaging suitable grooves 75); the cable is thus entirely protected against wear, and the point at which the ground rope is attached to the stretcher can be brought as close as desired to the ground. It should be noted that the eyelets of the stretching slat may be placed horizontally whereby shackle 35 is located in a vertical plane and thimble 12 in a horizontal plane, which allows a further lowering of the attaching point of the ground rope.

In the arrangement shown in Fig. 5, one of the shells 84 is larger than the other shell 85, and it is cut out at 86 sufficiently for the insertion of the part 87 of the shell 85. To assemble the apparatus, the parts 87 and 88 are fitted upon the cable, and a pin 82 is passed through aligned holes at the opposite ends of parts 87, 88. When the cable with its thimble is thus placed in position, the traction of the cable tends to separate the two shells 84—85, and hence to bring together the two half-sockets 87—88, thus pressing the latter strongly upon the cable. If desired, the two half-sockets 87—88 may be attached together or covered with a clamping ring.

In these two arrangements, the ground rope is connected to the slat in the known manner by a shackle passing through the thimble. However, pin 82 may also be constituted by one of the parts of a shackle or it may be connected to a shackle in any suitable manner. In this case, the thimble may be eliminated, and replaced simply by a knot, as shown in Figure 6; the arrangement shown in Figure 4 or 5 is suitably modified in order to fit upon said knot. It will be noted that, in this case, the bulk of the protecting member is much reduced, so that the point at which the ground rope is attached to the slat may be still further lowered.

As shown in Figure 7, the thimble may also be replaced by a suitable splice which is properly tied at the end.

Fig. 8 shows a modification in which the device adapted to receive and to protect the knot of the cable consists of a member 90, preferably provided with a recess 91, and carrying a strap 92 adapted to receive the connecting shackle 35 or the like. Strap 92 may be made integral with yoke 90 and may enclose more or less the knot of the cable.

Fig. 9 shows a modification in which the cable is a steel cable or a hemp cable provided with a steel core; said cable is held in a member 93 with tapered bore by means of a conical wedge piece 94, preferably striated, which may also be hollowed and split. The cable is inserted through member 93, its end is spread out, the wedge 94 is inserted into the middle of the cable 6 and the latter is then drawn back, so that the cable will be firmly held in member 93 by means of the wedge. As shown, strap 95 may be pivoted on small trunnions 96 of member 93, to facilitate the assembling. It will be noted that, when this device is used with steel cables, it will still possess one of the essential advantages of the invention, that is the attaching point of the cable can be lowered to the maximum, due to the small size of the attaching member.

The arrangement shown in Figure 10 is similar to the preceding, except that the end of the cable is enclosed in a metallic bottle shaped member 100 which is split lengthwise along one or several generatrices.

Fig. 11 shows another embodiment of the invention. The lower end of the wing stretcher 3 is provided with the usual shoe 10 and is pierced as near as possible to the bottom with an aperture 11 for the insertion of a cable 7 having at its end a thimble 12. The said thimble and also the thimble 13 at the end of the ground rope 6 are disposed within a protecting device 14, of tubular or like shape, and are held in place by bolt 15 or the like. 16 is a pivoted eyelet mounted on the device 14 and serves to attach the rope which usually borders the forward end of the wing. Due to this arrangement, the bottom part of the wing stretcher, which is also more or less rounded, will not project from the attaching member for the cables, and is thus prevented from sinking into the mud or from catching on obstacles.

With this arrangement, the attaching portions of the cables will now rub more strongly upon the ground, so that they must be protected against wear by the above mentioned metallic protecting device; however, since it is essential that the attaching points of the cables shall project to the minimum extent to avoid raising the cables themselves above the ground, one of the features of the present invention is to modify the attaching members in such manner that they will be as small as possible, including their protecting casing.

In the construction shown in Fig. 12, the thimble at the end of the cable is contained in a protecting casing 20 of a general bottle shape, and the thimble at the end of the ground rope 6 is contained in a protecting casing 21 of like shape. These two casings 20—21 are disposed on either side of the shoe 10, to which they are attached by straps 22 which are bolted at 23 to the lower part of the wing stretcher. The lower surface of the devices 20—21 and of the shoe 10 form a practically continuous surface, so that the bottom of the wing stretcher will not sink into the mud nor will it catch upon obstacles.

The bottom part of the wing stretcher may even be somewhat higher than the lower surface of casings 20—21, as shown.

It will be noted that the ground rope 6, which is covered with old rope or other protecting means, as usual, is as thick, or almost as thick, as the protecting members 20—21, whereby the ground rope will be in intimate contact with the ground.

In the construction shown in Fig. 13, the end of the cable is held in a protecting member 36, similar to casings 20—21, in the following manner: The end of the cable, after it has been inserted into the member 36, is undone and an object 37 of the proper size (such as an iron rod) is inserted at the centre of the cable, thus forming a bulged part 38; the end of the cable is again coiled and then spliced and bound with cord. Member 36 is connected to the wing stretcher by a pin 39 traversing both branches of its forked end, an attaching shackle being mounted on the said pin. The heads of said pin may be countersunk, for example by riveting into tapered recesses, so as to obviate all projecting parts.

It may happen that the net cable 8 as well as the ground rope, under the traction exercised upon them, or due to the effect of their twisted strands which may tend to screw upon the ground by friction, or for other reasons, will turn upon their centre lines and thus tend to rock the parts which are attached thereto, and chiefly the wing stretcher, about said centre line as an axis; hence the wing stretcher will often tend to lean inwardly or outwardly of the net.

To relieve the wing stretcher of all tilting torque to which it may be subjected, and according to a modified form of construction, the stretcher is connected to the lower cables or to their attaching members by a loose, flexible or pivotal connection.

In Fig. 14, the lower end of the wing stretcher 3 is traversed by a pivot pin 30, mounted in the vertical branches 31 of a skate 32 whose ends are provided with apertures 33 for the insertion of the connecting shackles for the ground rope and the net cable, or for the insertion of swivels 34. In this construction, the wing stretcher 3 is entirely relieved from tilting torques, and since the wing stretcher is not in contact with the ground it will not sink in the mud nor abut against obstacles. To assure the steady position of the wing stretcher, its upper end may be provided with floats or the like, and its lower end may be properly weighted. The swivels 34 also serve to relieve the shoe 32 from the torsion of the cables.

In the modification shown in Fig. 15, the lower end of the wing stretcher 3 is inserted into the fitting or socket 40 carrying lateral trunnions 41, which are mounted in the branches 31 of a skate 32 similar to the preceding. In this example, the hemp ground rope is connected to the shackle 34 by a protecting member 42 which contains the enlarged part of the ground rope formed as shown in Fig. 7 and is traversed axially by a pin 43 which is held in member 42 by an enlarged head 44 adapted for rotation thus forming a kind of swivel.

Fig. 16 shows a device similar to the preceding but wherein the stretcher and its skate, which are connected by a loose, flexible or pivotal connection, are provided with stops adapted to limit the oscillations of the stretcher under the effect of lateral submarine currents, or when the trawler turns, etc. In this embodiment of the invention, one branch 31$^a$ of skate 32 is extended by a fork which straddles a stud 70, secured to the stretcher and having a limited motion between the arms of said fork. Stretcher 3 is thus completely relieved from tilting torques resulting from a torsion of the cables, but its inclination, under a lateral force, is limited by the stop, skate 32 forming a stable base on the ground.

In Figs. 17 and 18, ground rope 6 and cable 7 are attached within a tubular member or skate 110 by means of pin 15. Said skate has an upper opening surrounded by a vertical flange 112 traversed by a pivot 111, to which is pivoted the lower end of stretcher 3. Flanges 112 are adapted to be engaged by stretcher 3 for a given inclination of the latter in order to limit the inclination of stretcher 3 with respect to skate 110.

In Fig. 19, skate 115, provided with eyelets 116 for attaching cables 6 and 7, has vertical branches 117 to which is pivoted the shoe 118 of stretcher 3. Said shoe is provided with lateral extensions 120 adapted to engage the upper face 119 of skate 115, for a given inclination of stretcher 3.

In the construction shown in Fig. 20, the shoe 50, fitted to the base of wing stretcher 3, ends in a lug 51 traversed by an elongated link 52 through which are inserted the shackles 35.

The construction shown in Fig. 21 is similar to the preceding, but herein the ring 53 traversing the lug 51 comprises a straight part 54 in contact with the ground and a circular part which permits the wing stretcher to turn freely from front to rear about the centre $o$ of this circular part.

In Fig. 22, the ground rope 8 forms the extension of the net cable 7, the lug 51 of the socket 50 being traversed by the said cable and being held in place by one or more stops 55 which are preferably mounted in a detachable manner.

Due to the increase in the stability obtained by the lowering of the attaching parts of the lower cables, the height of the wing stretchers can be much increased. In the known devices, the tilting of the wing stretchers produced effects which were the more detrimental as the stretchers were higher, and these could hardly exceed 1 meter in height; however, due to the improved attaching devices according to the invention, the stretchers can be readily given 5 or 6 meters height. This allows the construction of trawling gears (Fig. 23) whose wings 61 have a very great height. With such a gear, the net opening is no longer trapezoidal or elliptical as in the net shown in Fig. 1 or 3, but is rectangular, and the fishing surface is much increased. Fig. 23 shows at 62 a set of glass balls forming a float at the upper end of the wing stretcher, which is connected to the net cable 8 by a cable 63, the bottom of the wing stretcher being connected to the ground rope 6 and to the net cable 8 by any one of the aforesaid devices.

A net of this kind may be towed by two boats, as in the case of so-called "boeuf" fishing, and, in this case, the cables 63 may be extended unto the boats.

The opening of the net in width may also be assured by diverging shear boards or the like, situated at a great distance from the net, as shown in Fig. 24; herein the cables 63 are attached to the upper part of the shear boards and the net cables 8 to the lower part of said boards, which are towed by towing hawsers 65, at each side of the net.

These different arangements have the great advantage of assuring the continuous contact of the dragging cables or ropes with the ground, between the shear board and the net, this being a condition for an efficient fishing which could not hitherto be obtained.

The cables 63 and 8 preferably consist of neutral cables, or of cables in which the strands are wound in contrary directions, so that they will not twist around one another under the effect of traction. For this purpose they may also be provided with swivels at suitable points.

Obviously, the invention is not limited to the forms of construction hereinbefore described, which are given solely by way of example, the essential feature consisting in the fact that the attaching portion of the cable is protected while the cable is raised as little as possible above the ground.

Furthermore, the attaching and protecting devices above-described may be used for other purposes than those above-mentioned. For instance, they may serve to attach the ground rope to the shear boards in the case of otter-trawl gears, or to attach the dragging ropes 8 (Fig. 1) to the shear boards, in the case of V. D. fishing gears. They may also be employed to attach the different parts of a ground rope or other dragging rope, and chiefly when such ropes comprise parts of less strength adapted to break under abnormal strains.

Having now described my invention what I claim as new and desire to secure by Letters Patent is:

1. In a ground fishing gear, a ground net, towing means for said net embodying two dragging net cables, wing stretchers at the forward end of the net wings, respectively, a link attached to one end of the ground rope of the net and to the corresponding net cable, said link extending through an aperture at the base of the corresponding wing stretcher, and means for connecting the upper ends of said wing stretchers to said towing means.

2. In a ground fishing gear, a ground net, towing means for said net embodying two dragging net cables, wing stretchers at the forward end of the net wings, respectively, said wing stretchers having an aperture at the base and said net cables extending loosely through said apertures, respectively, stops on said net cables, on either side of said wing stretchers, respectively, and means for connecting the upper ends of said wing stretchers to said towing means.

3. In a ground fishing gear, a ground net, towing means for said net embodying two dragging net cables, wing stretchers at the forward end of the net wings, respectively, attaching means for said net cables and the ends of the ground rope of the net, at the lowermost portion of said wing stretchers, respectively, whereby the base of said wing stretcher does not project from said attaching means, means for connecting the upper ends of said wing stretchers to said towing means, and protecting members of small bulk enclosing the portions of said net cables and said ground rope adjacent said attaching means, respectively.

4. In a ground fishing gear, a ground net, towing means for said net embodying two dragging net cables, wing stretchers at the forward end of the net wings, respectively, attaching means for said net cables and the ends of the ground rope of the net, at the lowermost portion of said wing stretchers, respectively, whereby the base of said wing stretcher does not project from said attaching means, means for connecting the upper ends of said wing stretchers to said towing means and metallic casings of small bulk enclosing the thimbles of the net cables and ground rope, adjacent said attaching means, respectively.

5. A ground fishing gear as claimed in claim 3, wherein the lower ends of said wing stretchers form a substantially continuous surface with the lower surfaces of said protecting members.

6. In a ground fishing gear, a ground net, towing means for said net embodying two dragging net cables, wing stretchers at the forward end of the net wings respectively, a sliding member attached to one end of the ground rope of the net and to the corresponding net cable, means for pivotally connecting the base of said wing stretchers to said net cables, respectively, means for connecting the upper ends of said wing stretchers to said towing means and stop members on said sliding members and on said wing stretchers, respectively, and adapted to cooperate with each other for limiting the inclination of said wing stretcher relatively to said sliding member.

7. In a ground fishing gear, a ground net, towing means for said net embodying two dragging net cables, wing stretchers at the forward end of the net wings respectively, a sliding member attached to one end of the ground rope of the net and to the corresponding net cable, means for pivotally connecting the base of said wing stretchers to said net cables, respectively, means for connecting the upper ends of said wing stretchers to said towing means, said sliding member comprising an upwardly projecting flange bounding an aperture, the base of said wing stretcher extending through and being pivoted within said aperture, whereby said wing stretcher is adapted to engage said flange for an inclined position of the former.

8. In a ground fishing gear, a ground net, towing means for said net embodying two dragging net cables, wing stretchers at the forward end of the net wings respectively, a sliding member attached to one end of the ground rope of the net and to the corresponding net cable, means for pivotally connecting the base of said wing stretchers to said net cables, respectively, means for connecting the upper ends of said wing stretchers to said towing means, the base of said wing stretcher having lateral projections below and on either side of said pivotal connection, and adapted to engage the upper face of said sliding member for an inclined position of said wing stretcher.

In testimony whereof, I have signed my name to this specification.

JEAN BAPTISTE JOSEPH ALPHONSE VIGNERON.